United States Patent [19]

Osterkorn et al.

[11] 3,998,243
[45] Dec. 21, 1976

[54] FLAPPER VALVE FOR A ROTARY COMPRESSOR

[75] Inventors: Charles L. Osterkorn, N. Brunswick; Milton M. Kosfeld, Coltsneck, both of N.J.

[73] Assignee: Fedders Corporation, Edison, N.J.

[22] Filed: Nov. 19, 1975

[21] Appl. No.: 633,406

[52] U.S. Cl. .................. 137/856; 417/565
[51] Int. Cl.² .......................... F16K 15/16
[58] Field of Search ........... 137/525.3, 525.5, 855, 137/856; 417/565

[56] References Cited
UNITED STATES PATENTS

| | | | |
|---|---|---|---|
| 2,151,746 | 3/1939 | Cody | 137/525.3 X |
| 3,200,838 | 8/1965 | Sheaffer | 137/525.3 X |
| 3,568,712 | 3/1971 | Rinehart | 137/525.3 |
| 3,811,468 | 5/1974 | Bellmer | 137/525.3 X |

Primary Examiner—William R. Cline
Attorney, Agent, or Firm—McAulay, Fields, Fisher & Goldstein

[57] ABSTRACT

The flapper valve is to be utilized in a compressor of the type having a valve chamber adjacent a discharge or outlet port. The valve comprises a flexible valve member in the valve chamber which has a port closure at the front end thereof to seal the discharge port of the compressor. A backer plate is similarly received in the valve chamber and has one end in engagement with the rear end of the valve member to normally bias the port closure to a position wherein the discharge port of the compressor is closed. The valve member is provided with forwardly extending arms which cooperate with upturned ears on the backer plate to prevent longitudinal and lateral movement of the valve member. Accordingly, the valve member and backer plate need not be connected together prior to placement into the valve chamber. Alternatively, if the member and plate are connected together, their relative positions will be maintained even if the connection breaks.

8 Claims, 8 Drawing Figures

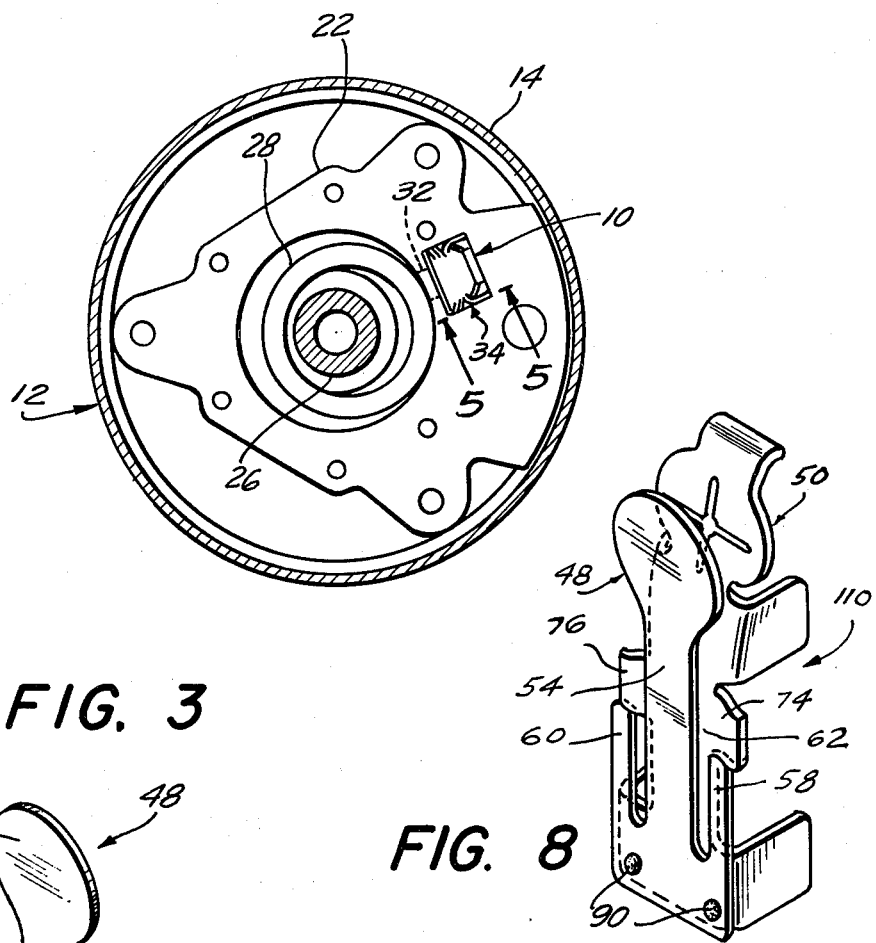
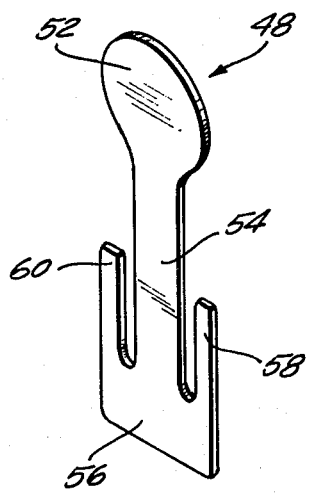
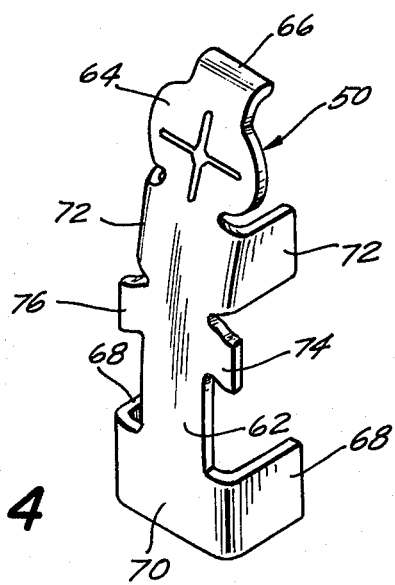

FLAPPER VALVE FOR A ROTARY COMPRESSOR

The present invention relates to a flapper valve and, more particularly, pertains to a flapper valve for use in a rotary compressor for sealing the discharge port in the absence of increased pressures due to operation of the compressor.

Rotary compressors of the type that are operated intermittantly, such as those used in air conditioning systems, normally require a valve at the discharge port to prevent back flow of the refrigerant to the compressor during periods of inactivity of the compressor. Moreover, it is imperative that such valves remain in position even though they may be subject to the vibratory action normally generated by such compressors. For example, one such type of valve construction is disclosed in U.S. Pat. No. 3,568,712, entitled "Suction Valve For Rotary Compressor". The aforementioned patent (which discloses a valve for a suction port opening rather than a discharge port opening) illustrates a valve member that is maintained in position by providing a slot in the valve chamber that receives a depending flange on the valve member. However, such constructions are costly since the slot must be cut by a separate machining procedure. Other constructions include valve members that are connected to backer plates by welding the same together, or the like. The backer plate and valve member combination is then inserted into the valve chamber. However, this latter valve construction also produces problems since the valve member does not operate properly if the weldment breaks.

Accordingly, an object of the present invention is to provide an improved flapper valve construction for a rotary compressor.

A more specific object of the present invention is to provide an economical flapper valve construction for a compressor.

A further object of the present invention resides in the novel details of construction that provide a flapper valve of the type described that is highly reliable in operation.

Accordingly, a flapper valve constructed in accordance with the present invention is adapted to be used in a compressor of the type having a valve chamber adjacent an outlet or discharge port for receiving the flapper valve therein. The valve comprises a flexible valve member having front and rear ends and a port closure is provided at the front end thereof. The valve also comprises a backer plate having one end in engagement with the rear end of the valve member to bias the port closure to a position wherein the discharge port is sealed. Cooperating positioning means is provided on both the valve member and the backer plate for retaining the valve member in position.

Other features and advantages of the present invention will become more apparent from a consideration of the following detailed description when taken in conjunction with the accompanying drawings, in which:

FIG. 2 is a sectional view of the compressor taken along the line 2—2 of FIG. 1;

FIG. 3 is a perspective view of the valve member portion of the valve construction of the present invention;

FIG. 4 is a perspective view of the backer plate portion thereof;

FIG. 8 is a perspective view of a modified embodiment of the present invention.

Figure 1:
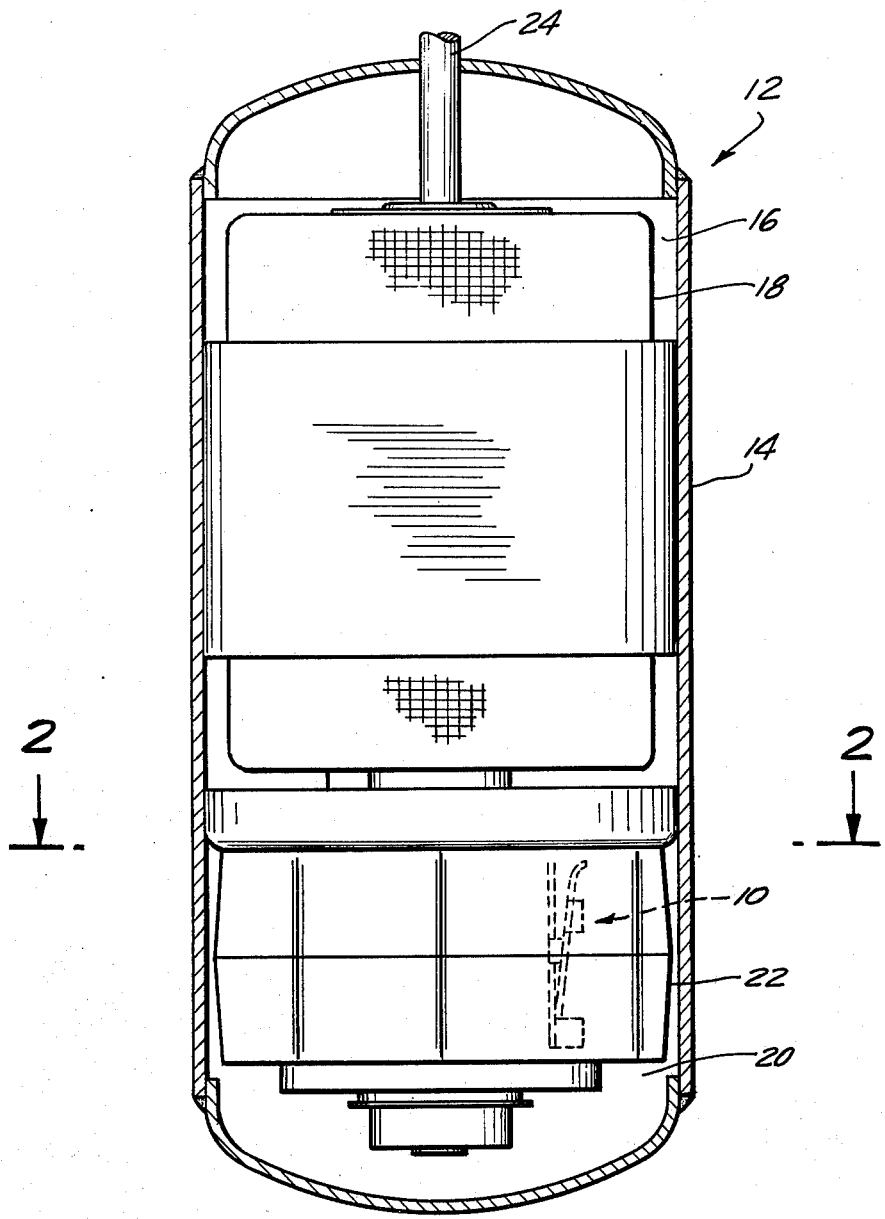
FIG. 1 is a vertical sectional view of a rotary compressor utilizing a flapper valve constructed according to the present invention.

A flapper valve constructed according to the present invention is designated generally by the reference numeral 10 in the figures, and is adapted to be utilized in a rotary compressor 12 of the type shown in FIGS. 1 and 2. The compressor 12 is conventional in construction and, therefore, only those parts necessary for an understanding of the present invention are shown in the figures. More specifically, the compressor 12 comprises a hermetically sealed housing 14 having an upper compartment 16 that receives a motor 18 therein and a lower compartment 20 that receives a compressor unit 22 therein. An outlet or discharge conduit 24 extends through the top of the housing 14.

The output shaft of the motor 18 is connected to an eccentric member 26 in the compressor unit that, in turn, drives a rotor 28 both of which are positioned within a circular compressor chamber 30. A vane (not shown in the interests of clarity) rides on the outer surface of the rotor 28 and separates the chamber 30 into high pressure and low pressure sides, in the conventional manner. A discharge port 32 connects the high pressure side of the chamber 30 to an appropriate outlet through a valve chamber 34 that is positioned adjacent to and communicates with the discharge or outlet port of the compressor chamber 30. The valve 10 is positioned in the chamber 34 and normally seals the outlet or discharge port 32. However, when the pressure within the compressor chamber 30 increases due to operation of the compressor unit, the valve opens to permit the refrigerant or the like to exit through the port 32.

Figure 5:
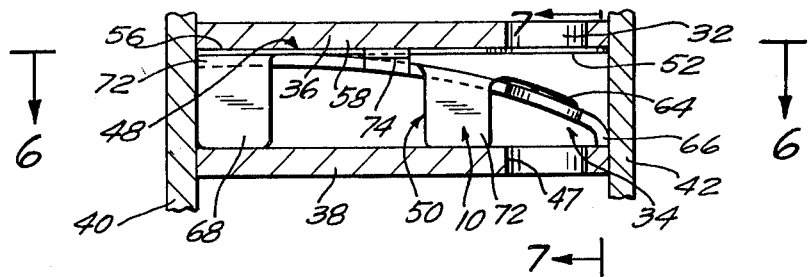
FIG. 5 is a sectional view taken along the line 5—5 of FIG. 2.
Figure 6:
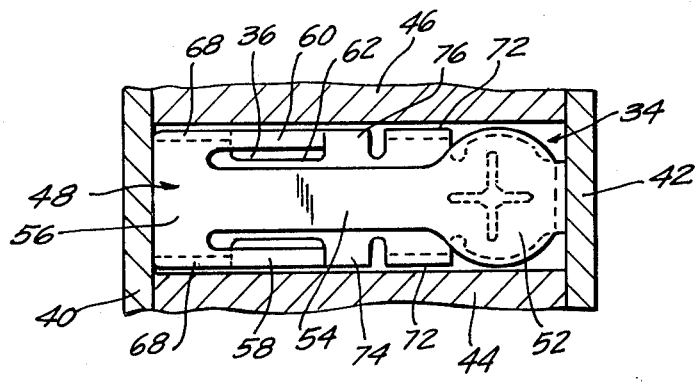
FIG. 6 is a sectional view taken along the line 6—6 of FIG. 5.
Figure 7:
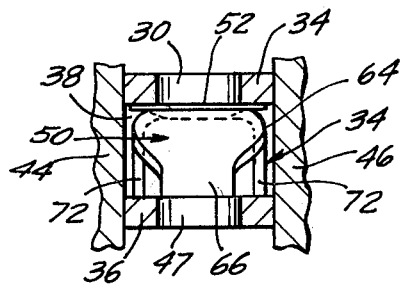
FIG. 7 is a sectional view taken along the line 7—7 of FIG. 5.

The valve 10 and valve chamber 34 are shown more specifically in FIGS. 5-7. The valve chamber 34 is defined by a top wall 36, a bottom wall 38, opposed end walls 40 and 42, and side walls 44 and 46. (The foregoing orientation of the valve and valve chamber has been assumed for descriptive purposes. That is, although FIG. 1 illustrates the valve in the upright position, for ease of reference, the wall 36 will be referred to as the top wall, the wall 38 will be referred to as the bottom wall, etc.) Additionally, as shown in FIG. 5, the bottom wall 38 is provided with an opening 47 which is in alignment with the outlet or discharge port 32 and through which the compressed fluid exits when the valve opens in response to an increased pressure.

The valve 10 comprises a valve member designated generally by the reference numeral 48 and a backer plate designated generally by the reference numeral 50. As shown in FIG. 3, the valve member 48 comprises a front end having a port closure member 52 in the shape of an enlarged circular member that is adapted to seal the outlet or discharge port 32. As viewed in FIG. 3, the body of the valve member is in the shape of an inverted T with the leg of the T comprising a narrow necked central portion 54 that connects the member 52 to the rear end 56 (or arm of the T) of the valve member. Extending forwardly from the rear end of the valve member are laterally spaced arms 58 and 60 which are respectively spaced from the central portion 54 and which terminates substantially before the member 52. The valve member is fabricated from a flexible material such as spring steel or the like.

The backer plate is rigid in construction and comprises a central longitudinally extending member 62 that terminates at the front end in a partially circular member 64 having a down turned lip 66. Provided at the rear end of the backer plate 50 are laterally spaced depending legs 68 that are in engagement with the bottom wall 38 of the valve chamber. The height of the legs 68 is substantially equal to the height of the chamber 34. Accordingly, as shown in FIG. 5, the rear end 70 of the backer plate 50 engages the rear end 56 of the valve member 48 and forces the end 56 into abutting engagement with the top wall 36 of the valve chamber, thereby causing the port closure member 52 to move into sealing engagement with the outlet 32.

The central portion 62 of the backer plate 50 curves downwardly from the front to the rear thereof, as shown in FIG. 5, to provide a space between the member 52 and the member 64 of the backer plate 50. Accordingly, the port closure member 52 may therefore be displaced or moved downwardly toward the partially circular member 64 of the backer plate 50 when the pressure of the fluid increases to permit the fluid to discharge through the outlet 32. A second pair of laterally spaced legs 72 depend from the central portion 62 of the backer plate from a point intermediate the ends of the backer plate to provide an intermediate support for the backer plate. The bottom edges of the legs 68 and 72 and the bottom edge of the lip 66 are adapted to engage the bottom wall of the valve chamber, as shown in FIG. 5.

As will be evident from a consideration of FIGS. 5 and 6, the length of the backer plate 50 is equal to the length of the valve chamber 34 (i.e., the distance between the end walls 40 and 42). That is, when the backer plate is received in the chamber 34, the rear edge of the legs 68 will engage the end wall 40 whereas the front surface of the lip 66 will engage the wall 42. In order to maintain the valve member 48 in position, the backer plate 50 is provided with upturned ears 74 and 76 that extend outwardly in opposite directions from the central portion 62 of the backer plate and taper outwardly and upwardly therefrom and engage the top wall 36 of the valve chamber. The ears 74 and 76 are sized and positioned on the central portion 62 so that the rear edges of the ears engage the forward edges of the arms 58 and 60 of the valve member when the rear edge of the valve member abuts the end wall 40 of the valve chamber. Thus, the valve member is effectively confined between the ears 74 and 76 and the wall 40 of the valve chamber. That is, the interengagement of the arms 58 and 60 of the valve member with ears 74 and 76 of the backer plate effectively provide means to prevent longitudinal or lateral movement of the valve member. In other words, the arms of the valve member and the ears of the backer plate may be considered to be positioning means which maintains the valve member in position.

In operation, the valve member 48 is placed on the top surface of the backer plate 50 with the central portion 54 of the valve member resting on the central portion 62 of the backer plate. The valve member is positioned so that the forward edge of the arms 58 and 60 are in engagement with the rear edges of the respective ears 74 and 76. With the valve member so positioned, the valve member and the backer plate are inserted into the valve chamber 34 in the orientation shown in FIG. 5. Accordingly, the member 52 of the valve member will seal the opening 32.

When the compressor unit 22 is operated, the increased pressure in the compressor chamber 30 will cause the closure member 52 to deflect thereby permitting the pressurized fluid to exit through the outlet or discharge port 32 and through the valve chamber 34 out of the opening 47. When the compressor unit is deenergized, the member 52 will assume its original position wherein it is in sealing engagement with the walls defining the outlet 32 to close the outlet port.

FIG. 8 discloses a modified embodiment of a flapper valve 110 constructed according to the present invention wherein like reference characters in the figures designate identical elements. The flapper valve 110 comprises a valve member 48 and a backer plate 50 similarly to the valve 10. However, in the construction of FIG. 8, the valve member and backer plate are connected together. That is, the rear end 56 of the valve member 48 is connected to the rear end 70 of the backer plate 50 by welding the same at 90.

The construction of FIG. 8 may be fabricated by placing the valve member 48 on the top surface of the backer plate 50 so that the forward edge of the arms 58 and 60 are in engagement with the respective ears 74 and 76. Thereafter, the rear end portions 56 and 70 may be welded together. The valve member and backer plate are then inserted into the valve chamber 34. Accordingly, this construction permits the elements to be aligned and fixed in position relative to each other prior to insertion into the chamber 34. Moreover, if the weldment breaks, the valve member will be maintained in position as in the embodiment of FIGS. 1–7.

Accordingly, a flapper valve has been described in which the valve member is easily inserted into the valve chamber and is maintained in a desired orientation therein.

While preferred embodiments of the invention have been shown and described herein, it will become obvious that numerous omissions, changes and additions may be made in such embodiments without departing from the spirit and scope of the present invention.

What is claimed is:

1. A flapper valve for a compressor of the type having a valve chamber adjacent an outlet port for receiving said flapper valve therein; said valve comprising a flexible planar valve member having front and rear ends, a port closure at the front end; and a backer plate having one end in engagement with the rear end of said valve member to bias said port closure to close the discharge port; and cooperating positioning means on said valve member and said backer plate for retaining said valve member in position, said positioning means comprising a pair of laterally spaced arms on said valve member extending forwardly from the rear end thereof, and a pair of upturned ears on said backer plate sized and positioned to engage the forward edges of said respective arms to prevent lateral and longitudinal movement of said valve member; said backer plate comprising first projection means at said one end of said backer plate extending in a direction away from said valve member for engaging a wall defining the valve chamber, said first projection means being sized to force said rear end of said valve means against the opposite wall of the valve chamber; and second projection means intermediate the ends of said backer plate extending in a direction away from said valve member for engaging the same chamber wall as said first projection means for positioning said backer plate in said valve chamber; said backer plate having a surface facing said valve member, said surface being curved in a direction away from said valve member from the rear to the front of said backer plate so that the portion of said backer plate opposite said port closure is spaced therefrom.

2. A flapper valve as in claim 1, said port closure comprising a circular member, and a narrow necked portion connecting said circular member to said rear end.

3. A flapper valve as in claim 1, in which the rear end of said valve member is welded to the rear end of said backer plate.

4. A rotary compressor comprising a compression chamber having a discharge port; a valve chamber adjacent said discharge port comprising opposed end and side walls and top and bottom walls, said discharge port extending through said top wall; and a flapper valve received in said valve chamber; said flapper valve comprising a flexible planar valve member having front and rear ends, a port closure at the front end of said valve member, and a backer plate having one end in engagement with the rear end of said valve member to force said valve member against said top wall of said chamber whereby said port closure seals said discharge port; and cooperating positioning means on said valve member and backer plate for retaining said valve member in position in said chamber; said positioning means comprising a pair of laterally-spaced arms on said valve member extending forwardly from the rear end thereof and terminating substantially behind said port closure, and a pair of upturned ears on said backer plate, said ears tapering outwardly toward said side walls and upwardly toward said top wall and engaging said top wall, said ears being sized and positioned to engage the front edges of said arms, respectively, when the rear edge of said valve member abuts said end wall of said valve chamber to prevent lateral and longitudinal movement of said valve member.

5. A rotary compressor as in claim 4, in which said backer plate comprises a first pair of legs extending downwardly from said one end and engaging said bottom wall of said chamber, said first pair of legs being substantially equal in height to the height of said chamber whereby said one end of said backer plate forces said rear end of said valve member into abutting engagement with said top wall, and a second pair of legs intermediate the ends of said backer plate extending downwardly and into engagement with said bottom wall to maintain said backer plate in position in said valve chamber.

6. A rotary compressor as in claim 5, in which said backer plate has a surface facing said valve member, and said surface is curved in a direction away from said valve member from the rear of said backer plate to the front thereof, so that the portion of said backer plate opposite said port closure is spaced therefrom.

7. A rotary compressor as in claim 4, said port closure comprising a circular member, and a narrow necked portion connecting said circular member to said rear end.

8. A rotary compressor as in claim 4, in which the rear end of said flapper valve is welded to said one end of said backer plate.

* * * * *